May 16, 1950  G. S. PERKINS  2,507,930
SCREEN FOR CONFECTIONERY MACHINES
Filed April 9, 1949  3 Sheets-Sheet 2
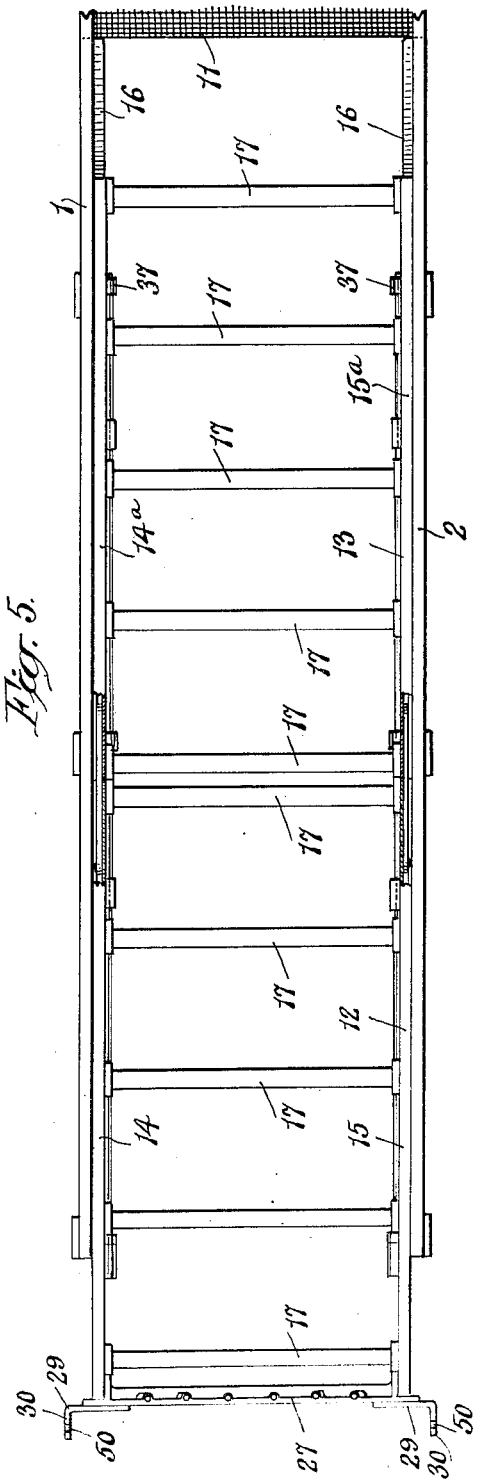
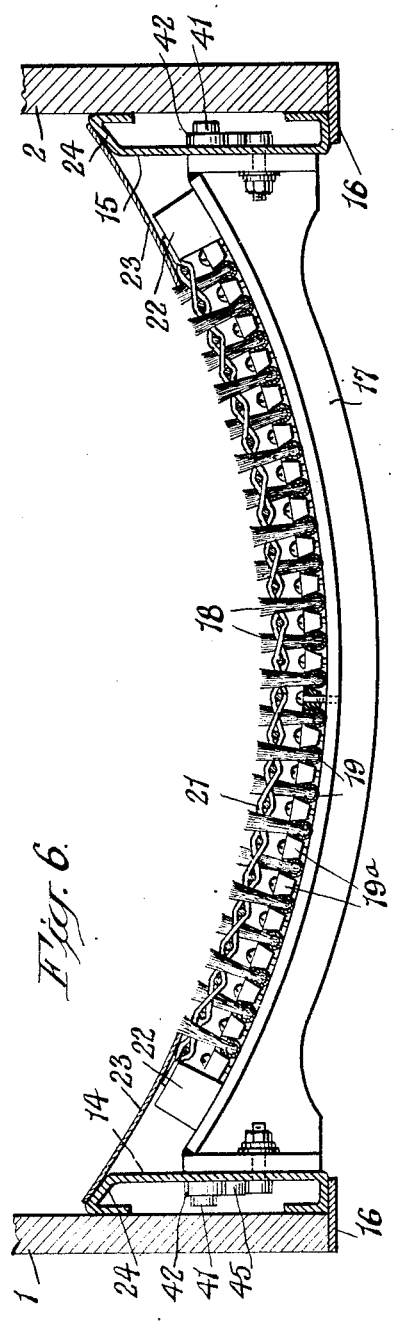
INVENTOR.
George S. Perkins
BY
ATTORNEY

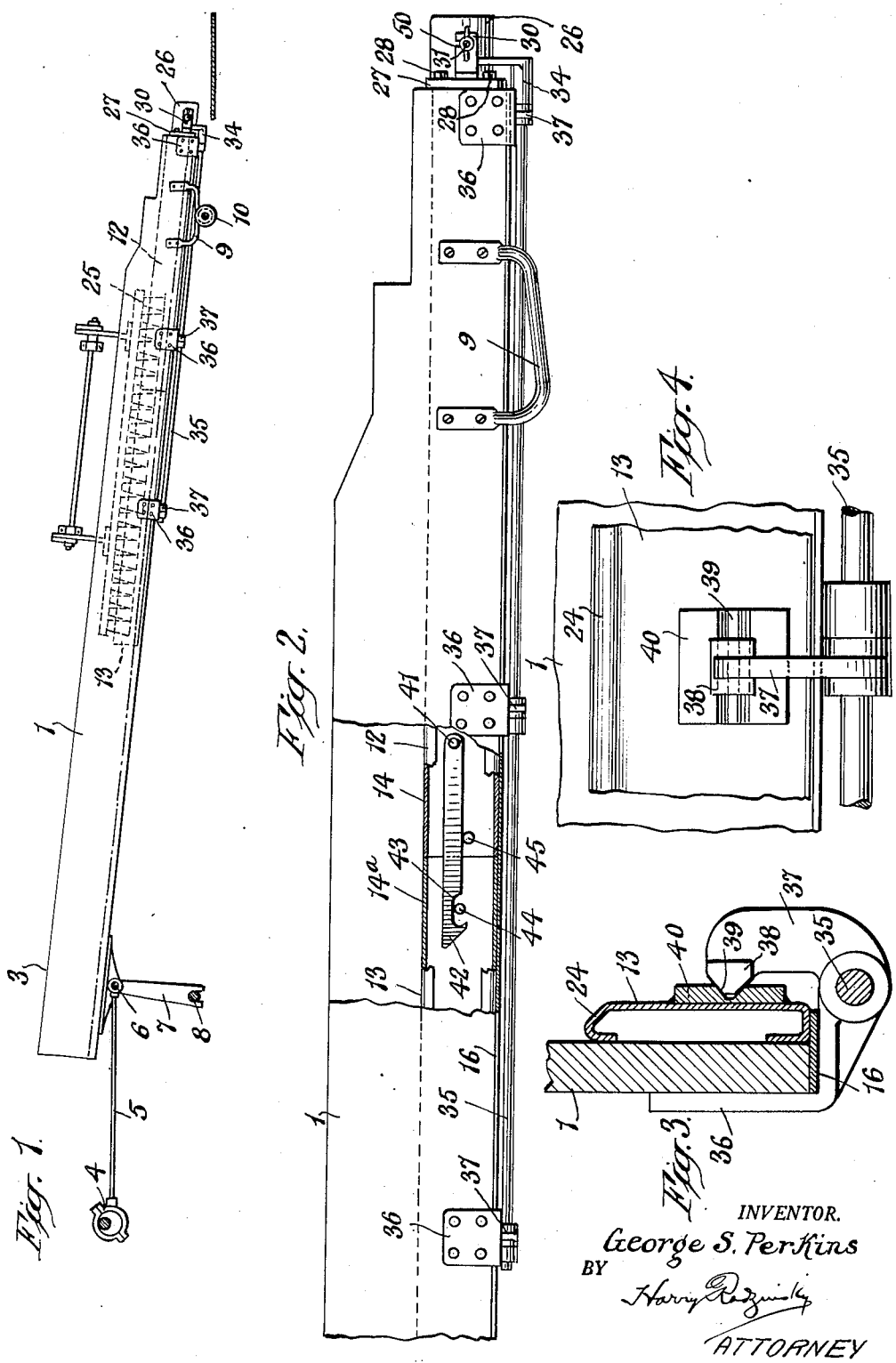

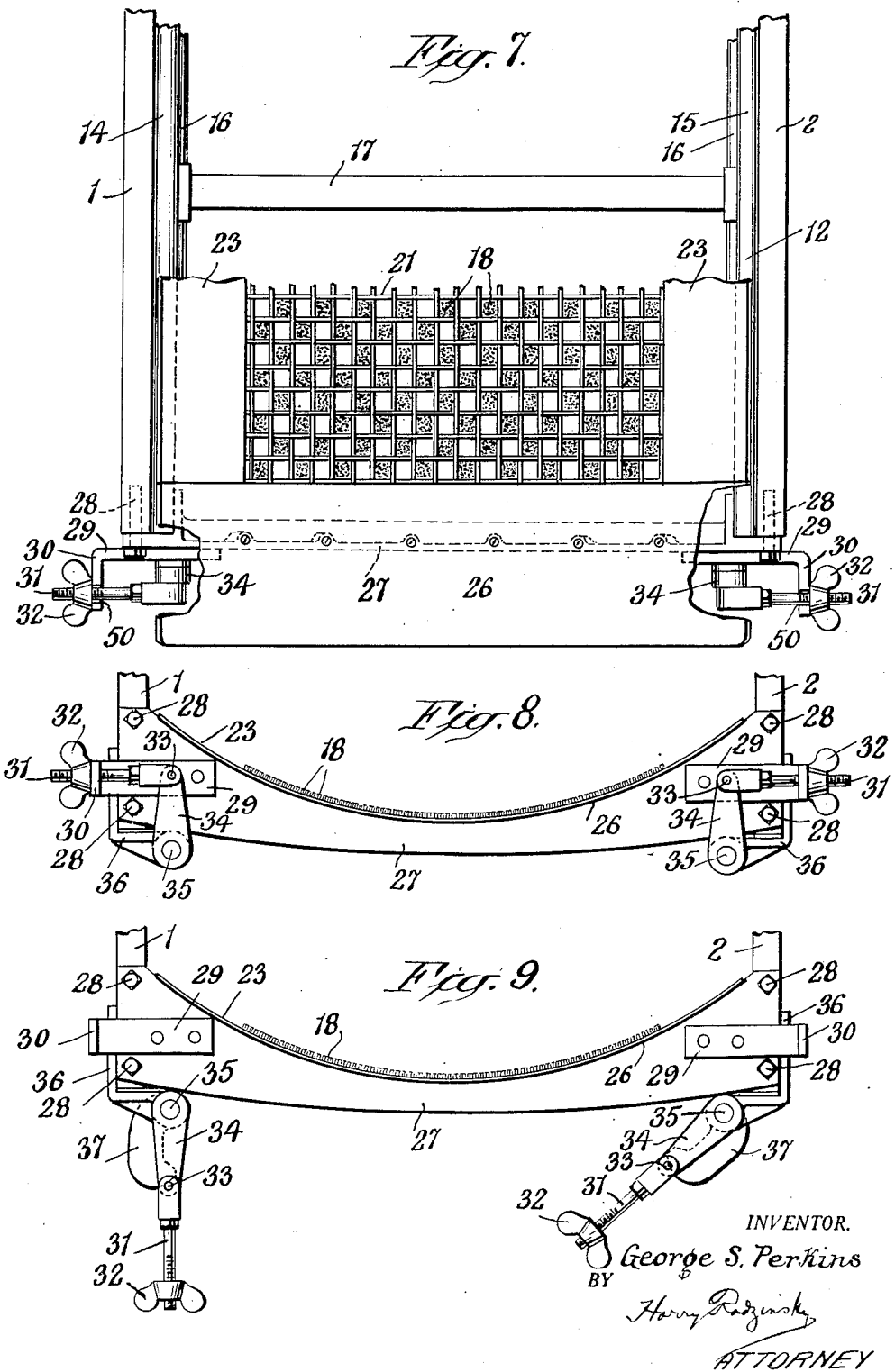

Patented May 16, 1950

2,507,930

UNITED STATES PATENT OFFICE 2,507,930

SCREEN FOR CONFECTIONERY MACHINES

George S. Perkins, Kew Gardens, N. Y., assignor to National Equipment Corporation, New York, N. Y., a corporation of New York Application April 9, 1949, Serial No. 86,510

11 Claims. (Cl. 107—44)

This invention relates to screens for confectionery or candy-making machines, and has for its primary object the provision of a screen which can be easily installed; easily removed for cleaning and readily replaced whenever required.

In certain types of confectionery or candy-making machines, mold or matrix material, such as starch, is deposited in a tray which is then transported to an imprinter which forms a plurality of depressions or mold cavities in the matrix material. The imprinted material borne by the tray is then carried to a depositor which fills each of the mold cavities with a fluid confection. This is permitted to harden or set and then the mold material and the candies therein are deposited on an inclined oscillating screen. The oscillations of the screen tend to separate the starch matrix material from the candies and the starch sifts downwardly through the screen into a collection chamber. The candies are tumbled over and over along the length of the screen. Adjacent to one end of the screen the candies pass over an area of bristles protruding upwardly through the screen, at the same time being subjected to the wiping action of a swinging brush located above the bristled portion of the screen. Finally, at the lower end of the screen, the cleansed candies are collected in a suitably-placed collection receptacle.

In this type of machine as known at the present time, the screen is of considerable length; it is located in the lower portion of the machine and is thus somewhat difficult to reach for adjustment and especially for removal and cleaning. This is particularly true of that portion of the screen provided with the bristles which collect the starch particles and soon cease to properly cleanse the candies tumbled over them.

The main object therefore, of the present invention is to provide a screen of sectional nature together with an improved means for holding the sections of the screen in place, such means being readily accessible and enabling the screen, or at least those portions thereof which require cleaning after relatively short intervals, to be readily removed, cleaned and replaced, requiring very short stoppage of the machine for the purpose. By the improved means to be hereinafter disclosed, speedy replacement of those parts of the screen which are subject to wear is readily had; the means which hold the screen sections in operating position are readily accessible and easily operated and since the parts of the screen which more often require cleaning are readily accessible, the cleaning operation is made simple and quick and the operation of the machine is not held up for any consequential periods of time.

These and other objects are attained by the invention, a more particular description of which will hereinafter appear and be set forth in the claims appended hereto.

In the accompanying drawings, wherein an illustrative embodiment of the invention is shown, Fig. 1 is a side elevation of the improved screen; Fig. 2 is a side elevation of a portion of the screen, with a part of one of the side rails broken away, and other parts of the structure being shown in section, to disclose construction; Fig. 3 is a vertical sectional view through one of the side rails and screen side members, showing one of the clamps; Fig. 4 is a view of the structure shown in Fig. 3, looking from the right of the same; Fig. 5 is a top plan view of the screen with the screening and bristles removed, showing how the two removable sections of the screen are drawn out; Fig. 6 is a transverse sectional view through the screen; Fig. 7 is a top plan view of the forward end of the screen with parts broken away to disclose construction; Fig. 8 is a front view of the screen showing the locking device in its closed position, and Fig. 9 is a similar view, showing the locking means in its open position.

Referring to the drawings, and particularly to Figs. 1, 2 and 5 thereof, the two side rails of the screen support are indicated respectively at 1 and 2. These bars 1 and 2 are suitably connected together to form a strong supporting frame structure, the transverse reinforcing elements thereof being omitted to simplify illustration. The supporting frame, of which the side rails 1 and 2 form a part, is thus a lengthy, rectangular frame located in the lower portion of the confectionery machine, and the candies are deposited from the starch molds upon the foraminous screen supported by this frame. The candies are deposited at the higher end of the screen, or that generally indicated at 3 in Fig. 1, and a rocking or oscillating motion is imparted to the screen frame, causing the candies to tumble over the surface of the screen toward the lower end thereof, the starch from the mold sifting downwardly through the screen into a suitable receptacle provided below the screen.

The means for rocking the screen frame is shown in Fig. 1, the same consisting of the eccentric 4 coupled by the link 5 to the pivotal connection 6 on the arm 7 mounted on the cross rod 8. At the forward or lower end of the screen frame, each of the side rails 1 and 2 is provided with a rail 9 riding on a roller 10. Through this arrangement, the rocking or oscillating movement is imparted to the screen frame, causing the candies on top of the screening to be tumbled as above explained. Toward its rear end, the screen frame is provided with fixed screening shown at 11 in Fig. 5. This portion of the screening needs replacement only after long periods of use, hence it can be permanently installed in any suitable manner between the two side rails 1 and 2. The portion of the screening that is located toward the forward end of the frame, is that which needs frequent cleaning and occasional replacement and it is therefore desirable that this forward portion of the screening be made readily removable and easily replaceable.

With this in view, the forward portion of the screen is composed of two frame sections indicated respectively at 12 and 13. The front frame section, or that indicated at 12, includes a pair of similar, channelled side members indicated respectively at 14 and 15. These members fit between and adjacent to the two side rails 1 and 2 and are slidably supported upon rails 16 fastened along the bottom edges of the side rails 1 and 2, as clearly seen in Fig. 6. The two side members 14 and 15 are connected by downwardly arched cross braces 17 located at suitably spaced positions to result in a strong frame structure. Secured to the upper or concave surfaces of the cross braces 17 are upwardly-directed bristles 18 which are held in tubes 19 clamped against the top of the braces by wedge-shaped retaining members 19a. The bristles protrude upwardly and rise above the surface of a wire mesh screen 21 which is curved to conform to the curvature of the tops of the braces 17 and is attached at its longitudinal edges to the bars 22. Deflector plates 23, secured to the top flanges 24 of the side members 14 and 15 are directed inwardly from said members 14 and 15 to meet the side terminals of the bristled area of the screen.

As the candies are tumbled over this bristled area of the screen, the upwardly-extending bristles 18 clean the candies of the adherent mold starch, which cleansing action is further facilitated by means of a swinging brush 25 shown in dotted lines in Fig. 1. This type of swinging brush is known in confectionery machines and therefore is not described in detail herein.

The second removable portion of the screen, indicated at 13, is similar in construction to that shown at 12. That is to say, it has the side members 14a and 15a corresponding to those shown at 14 and 15 in the forward screen frame 12, and connected by the cross members 17. The section 13 is provided with the bristles, screening and other elements described with respect to the front section 12. The forward end of the front section 12 is provided with an apron 26 over which the cleaned candies are tumbled to reach a container or be deposited upon a surface placed in front of and below the apron.

The means for holding the two removable sections 12 and 13 of the screen in place, will now be described. Secured to and extending between the two side members 14 and 15 at the front end of the screen section 12, is a cross member 27 which has its end extending beyond the side members 14 and 15 and these projecting ends overlie the ends of the side rails 1 and 2 to which they are fastened by means of the bolts 28. Secured to the face of the cross member 27 at each end of the same is a bracket 29 formed with a laterally extending lug portion 30 provided with a notch 50 into which a threaded pin 31 is adapted to be fitted, as seen in Figs. 7 and 8. A wing-nut 32 is adjustably received on the threaded portion of the pin 31 while the opposite end of said pin is pivoted at 33 to an arm 34 secured on a rocking shaft 35 rotatively supported in brackets 36 secured to the side rails 1 and 2 as seen in Fig. 2.

Also secured upon the shaft 35 are clamping fingers 37 having wedge-shaped ends 38 adapted to fit into grooves 39 formed in plates 40 secured to the inner faces of the side members 14 and 14a, 15 and 15a.

In Fig. 2 will be seen a coupling means for holding the two screen sections 12 and 13 together, and particularly when it is desired to remove the same for cleansing or replacement. Pivoted at 41 within each of the side members 13 and 14 is a hook 42 having its lower edge provided with an elongated notch 43 adapted to engage with a pin 44 provided on the section 13 within each of its side members 14a and 15a. A stop pin 45, located below the hook 42 limits the descent of said hook.

From the foregoing, the operation of the apparatus will now be readily understood. As has been explained, the rear portion of the screen, or that part located at the rear part of the side rails 1 and 2, may be fixed and while made removable, it need not be made particularly accessible since it needs cleaning and replacement only after relatively long periods of use. The forward portion of the screen, and particularly that having the bristled surface, requires frequent cleaning and occasional replacement of the bristles. This area, defined by the screen sections 12 and 13, must therefore be made readily removable for the above purpose. In Figs. 7 and 8, the screen sections 12 and 13 are shown in place, the same being held against forward or longitudinal shifting movement relatively to the side rails 1 and 2 by the locking means at the forward end of the screen as well as the clamping means shown in Fig. 3 and 4.

To remove the screen sections 12 and 13 the bolts 28 are first withdrawn. This frees the cross member 27 from its attachment to the ends of the side rails 1 and 2. Next the wing-nuts 32 are loosened, permitting the arms 34 to be manually swung downwardly as shown in Fig. 9. Such downward swing of the arms 34 and the pins 31 carried thereby, imparts a rocking movement to the shafts 35, resulting in the clamping fingers being swung downwardly out of and away from the notches 39 and to a position below the various cross braces 17. The end screen section 12 is now pulled forwardly, the beginning of such movement being shown in Fig. 5, and as it is so drawn forwardly, it will pull the section 13 along with it since said section 13 is coupled to the section 12 by means of the hooks 42 being in engagement with the pins 44. When the section 12 is pulled out beyond the forward end of the side rails 1 and 2, the operator can lift the hooks 42 to free the same from the pins 44, thus freeing the section 12 from the rear section 13, permitting the section 12 to be carried away for cleaning. Section 13 can then be pulled forward off the rails 16 for cleaning.

In replacing the screen sections 12 and 13, the section 13 is first placed between the rails 1 and 2 and is slid along the same for a distance sufficient to permit the rear part of the section 12 to be placed between the rails 1 and 2. As the section 12 is then pushed inwardly, the rear ends of its side members 14 and 15 will abut against the forward ends of the side members 14a and 15a and will force the screen section 13 inwardly along the supporting rails 16 until the section 12 has its inward insertion halted by the impingement of the cross member 27 against the front ends of the side rails 1 and 2.

As the section 12 is pushed inwardly, its hooks 42 will ride over the pins 44 and the notches 43 will engage over these pins as shown in Fig. 2. When the cross member 27 comes into contact with the ends of the side rails 1 and 2, the screen sections 12 and 13 will then have reached their proper positions, with the rear end of the section 13 reaching the permanent portion 11 of the screening, and the rear end of the front section 12 abutting against the front end of the section 13 thus forming a continuation thereof. The screen sections are held in this position by the insertion of the bolts 28, and then by swinging the arm 34 upwardly to locate the threaded pins 31 in the slots in the brackets 30. The wing-nuts are tightened to hold the parts in this position, which is shown in Figs. 7 and 8. By the upward swing of the arms 34, the shafts 35 are rocked causing the clamping fingers 37 to be swung upwardly and have their tapered ends 38 brought into the notches 39 in the plates 40. These clamps firmly bind the side members 14, 14a, 15 and 15a to the side rails 1 and 2 so that the screen sections 12 and 13 are thus securely maintained between the two rails 1 and 2 and will not be shaken loose or independently vibrated during the vibratory movements of the screen as a unit. By means of the manner in which the forward sections of the screen are readily removable and replaceable, the operation of the machine is required to be halted for only very short periods resulting in greater output and efficiency.

Having described one embodiment of the invention, it is obvious that the same is not to be restricted thereto, but is broad enough to cover all structures coming within the scope of the annexed claims.

What I claim is:

1. In a screen of the character described, a supporting frame including a pair of spaced side rails, a plurality of separate and independent screen sections placed end-to-end between the rails, means for supporting said screen sections, a cross member secured to one of the screens and located at one end of the rails, means for attaching said cross member to the end of the rails, locking means carried by one of the screens and by the rails for holding said screen against longitudinal movement relative to the rails, means for clamping parts of the screen sections against the rails, and a disengageable coupling means for holding the screen sections together while the same are located between the rails.

2. In a screen for confectionery machines, a vibrated frame for supporting a plurality of screen sections placed end-to-end, said frame including a pair of side rails between which the screen sections are located, locking means at the end of one of the screen sections for holding the same against longitudinal movement out of the frame, clamping means for holding parts of the screen sections against the side rails, and means by which said locking means and said clamping means are simultaneously manually operated.

3. In a screen for confectionery machines, an elongated supporting frame including a pair of spaced parallel side rails, a plurality of screens placed end-to-end between the rails, each screen including side members disposed against the inside surfaces of the side rails, pivoted clamping members carried by the side rails and swingable to clamp the side members of the screens against said side rails, a cross member at the forward end of one of the screens having parts overlying one end of the side rails, swinging locking means carried by the side members adjacent to one end of the same, lugs projecting from the cross member for the reception of said locking members, and rocking shafts upon which the swinging locking means and the clamping members are mounted whereby rocking movements of said shafts will simultaneously move the clamps and locking means to operative or inoperative positions.

4. In a screen for confectionery machines, a frame including side rails, a screen removably fitted between the rails, a cross member at the forward end of the screen, means for attaching said cross member to the forward ends of the rails, and locking means for holding said screen between the rails comprising swinging elements supported by the rails and lugs carried by the cross member for receiving said locking members.

5. In a screen for confectionery machines as provided for in claim 4, wherein the locking means includes clamping elements for engaging parts of the screen and clamping the same against the inner faces of the rails.

6. In a screen for confectionery machines, an oscillated frame including a pair of longitudinally extending rails, a pair of separate removable bristled screen sections supported between the rails, coupling means for linking said screen sections together, means at the end of one of the screens for attaching said end of the screen to the rails, and locks adjacent to the point of attachment of the screen to the rails for connecting said screen to said rails.

7. In a screen for confectionery machines, a frame including a pair of spaced, parallel, longitudinally extending rails, a plurality of screen sections slidably mounted on the rails, a cross-piece on the forward end of the front screen on the rails, fasteners for attaching said cross-piece to the forward ends of the rails, rock shafts below the rails, clamping fingers on said rock shafts, bolts carried by said rock shaft, and lugs on the cross piece for receiving the bolts, whereby a rocking movement of the shafts to place the bolts in the lugs will cause the clamping fingers to simultaneously clamp parts of the screens against the rails.

8. In a screen for confectionery machines, a frame including a pair of spaced rails, a pair of separate and removable screens placed end-to-end and slidable between the rails, means on one of the screens for fastening its forward end to the forward ends of the rails, and clamps carried by the rails and operative against parts of the screens to clampingly urge the same against face portions of the rails.

9. In a screen for confectionery machines as provided for in claim 8, wherein each screen consists of a frame provided with channel-shaped side members, coupling hooks within one of said side members, pins engaged by said hooks to couple the pair of screens together in end-to-end relation, the clamps being in the form of swinging elements operative against the inner surfaces of the side members to force said side members against the inner faces of the rails, locking means for coupling one of the side members to the rails, and means by which a clamping action is secured by the clamps simultaneously with the movement of the locking means into locked position.

10. In a screen construction for confectionery machines, a frame provided with spaced side rails, said rails being each provided with a track along its lower edge, a plurality of screen frames slidably supported in end-to-end relation on said tracks between the side rails, said frames being each composed of side members connected by cross pieces, one of the cross pieces at the forward end of one of the screen frames carrying locking elements, co-operating locking elements carried by the side rails for engagement with those provided on the cross piece, clamps operative to clamp the side members of the screen frames against the side rails, and means for coupling together the clamps and the locking elements carried by the side frames whereby the locking elements are interengaged and the clamps placed in clamping position simultaneously.

11. In a screen for confectionery machines, a frame mounted for oscillating movement, said frame having a fixed rear portion of foraminous nature, the frame having side rails, a plurality of removable screen portions of foraminous and bristled nature placed end-to-end betwen the side rails, and slidable to bring the same forwardly and away from the side rails, coupling means by which a forward removing movement of one of said screen sections will bring that behind it toward the front of the frame, and means at the front of the frame for locking said screen sections against forward movement.

GEORGE S. PERKINS.

REFERENCES CITED

The following references are of record in the file of this patent:

UNITED STATES PATENTS

| Number | Name | Date |
| --- | --- | --- |
| 1,405,067 | Nuss et al. | Jan. 31, 1922 |
| 2,018,418 | Rapisarda | Oct. 22, 1935 |